(No Model.)
W. WATSON.
MILK COOLER.
No. 425,920. Patented Apr. 15, 1890.
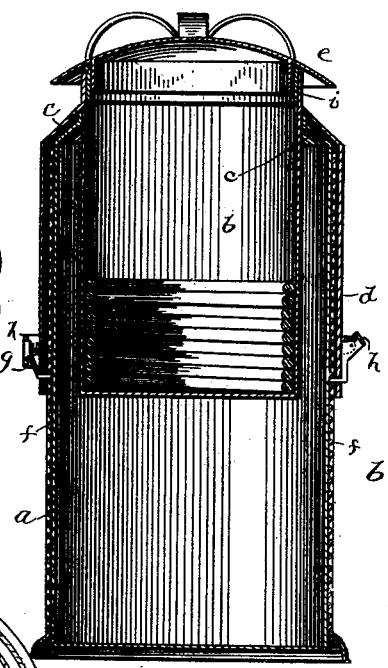
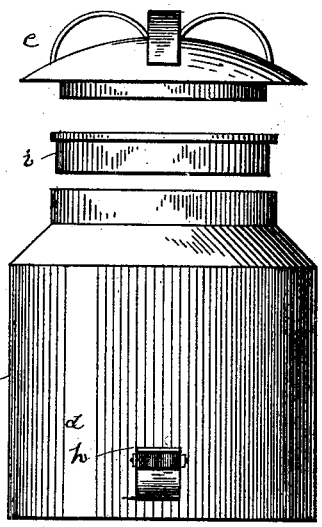
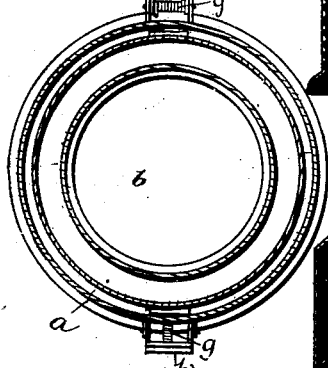
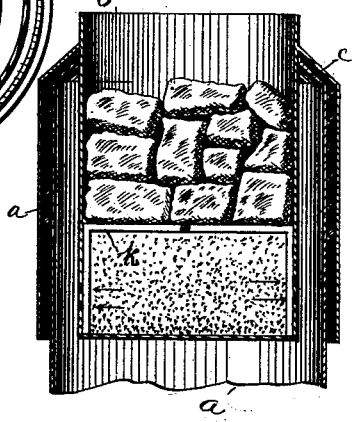
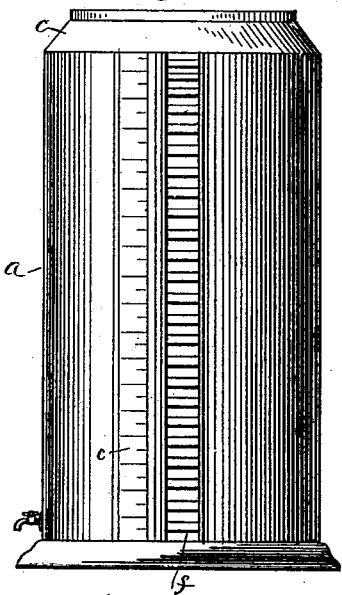
Witnesses:
E. C. Duffy
H. E. Peck
Inventor.
William Watson
per O. E. Duffy
Attorney

UNITED STATES PATENT OFFICE.

WILLIAM WATSON, OF WASHINGTON, DISTRICT OF COLUMBIA.

MILK-COOLER.

SPECIFICATION forming part of Letters Patent No. 425,920, dated April 15, 1890.

Application filed July 5, 1889. Serial No. 316,625. (No model.)

*To all whom it may concern:*

Be it known that I, WILLIAM WATSON, of Washington, in the District of Columbia, have invented certain new and useful Improvements in a Combined Milk-Cooler and Refrigerator; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to certain improvements in a combined milk-cooler and refrigerator.

The object of the invention is to provide a cheap, simple, and durable milk-cooler easy to keep clean and exceedingly compact and inexpensive in construction, and composed of a minimum number of parts, and which can be used as a refrigerator while cooling the milk, and can also be used as a water filter and cooler when not being used as a milk-cooler. These objects are accomplished by and my invention consists in certain novel features of construction and combinations of parts, more fully described hereinafter, and particularly pointed out in the claims.

Referring to the accompanying drawings, Figure 1 is a central longitudinal section of the device. Fig. 2 is a cross-section. Fig. 3 is a detail elevation of the ice-box and its cover. Fig. 4 is an elevation of the milk-can.
Fig. 5 is a detail view of a spring-washer. Fig. 6 is a section of the device, showing a modification.

In the drawings, the reference-letter $a$ indicates the milk vessel or receptacle, having a suitable base, as shown, and open at the top.

$b$ indicates the ice receptacle or vessel, closed at the bottom and open at the top, and of such an external diameter that it can fit or slide down into the milk-receptacle from the top and leave an annular space around itself within the wall of the milk-receptacle.

The top edge of the milk-vessel is tapered inwardly or provided with an annular inwardly-extending ledge $c$ to snugly fit and form a tight joint with the periphery of the cylindrical ice-box. This ice-box is provided with an external concentric casing or sheathing $d$, secured to the ice-box around its upper end and depending from the same, so that the lower edge of the outer casing will be in about the same plane as the bottom of the ice-box, and this casing is sufficiently large in diameter to slide upon the exterior of the milk-vessel, leaving a space between the wall of said ice-box and said casing to admit the wall of the milk-vessel. The ice-box is provided with a cover—such as $e$—to close its upper end.

It is obvious that the ice is placed in the ice-box and that when the ice-box is inserted in the upper open end of the vessel containing the milk it will slide down into the same and force the milk up into the narrow space around the cold walls of said box, and thereby thoroughly cool the same.

The ice-box is secured at the desired height in the milk can or vessel by means of one or more vertical racks $f$, longitudinally located on the exterior of the milk-can, and consisting of a raised strip having a series of apertures or a strip having a vertical series of ratchet-notches and a pivoted spring pin or catch $g$ for each rack, which is carried by the outer depending casing $d$ and is secured upon the exterior of the same and provided with a handle end, and a pin on the opposite end extending through said casing to engage a rack. The ice-box is provided with handles $h$ on opposite sides, by means of which the same can be raised, and the catches are inclosed by the handles, as shown, or the handles themselves can be pivoted and provided with pins and springs, so that when upward pressure is exerted on them they will release the ice-box and allow it to be removed.

The ice-box cover is provided with a number of handles located at right angles to each other, so that they will form legs or supports for the cover when removed and turned bottom up, and the cover, when in this position, can be used to support the ice-box when removed from the milk-can for any reason. The interior of the box can be provided with an internal coil, as shown, to surround the ice and prevent injury to the walls of the box, and a removable wire supporting-frame $k$ rests in the ice-box above the ice and is adapted to support foods or other things in the ice-box while the milk is being cooled.

The milk-vessel can be provided with a glass gage or glass-covered opening to show the height of the milk therein, and, if desirable, it can also be provided with a thermometer.

A split flanged spring-washer $i$ is provided to fit in the upper open end of the ice-box, so that the cover will fit tightly, or it can fit into the opening of the milk-can, so that a tight joint will be formed between the can and ice-box, and the flange prevents the milk from spilling or splashing out of the can.

Instead of having racks by means of which the ice-box can be held in the desired vertical adjustments, the extension of the milk-vessel can be provided with a spiral groove in which projections or a corresponding bead on the interior of the depending casing fits, so that the ice-box will descend by gravity as far as the quantity of milk in the milk-vessel will admit. (See Fig. 6.)

This device can be used for many purposes, all of which it is not necessary to mention. For instance, the vessel $a$ might be provided with a faucet and the ice-box provided with openings into the vessel $a$ and with a layer of filtering material upon which the ice can rest. The water will be poured into the ice-box and will percolate through the same into the vessel $a$, where it will be kept cool, and from which it can be drawn as desired. (See Fig. 6.)

It is evident that various changes might be made in the form and arrangement of the parts described without departing from the spirit and scope of my invention; hence I do not wish to limit myself to the exact construction herein set forth.

What I claim is—

1. The combination, with a vessel open at the top and provided with a vertical rack, of an ice-box fitting in the upper end of said vessel and provided with a depending casing surrounding the vessel, and a catch carried by said casing to engage the rack, substantially as described.

2. The combination, with a vessel open at the top and provided with an inwardly-extending annular ledge around its upper open end, of an ice-box extending into the vessel through the open end thereof and of a size to leave a space around itself within said vessel, and means to adjustably hold said box in the desired vertical adjustment, substantially as described.

In testimony that I claim the foregoing as my own I affix my signature in presence of two witnesses.

WILLIAM WATSON.

Witnesses:
OWEN E. DUFFY,
H. E. PECK.